US008255582B2

(12) United States Patent
Wong et al.

(10) Patent No.: US 8,255,582 B2
(45) Date of Patent: Aug. 28, 2012

(54) OPTICAL COMMUNICATION MODULE, UNIVERSAL SERIAL BUS CABLE WITH THE SAME AND PROCESSING METHOD OF DATA TRANSFER THEREOF

(75) Inventors: Kwokleung Wong, Hong Kong (CN); Fukming Lam, Hong Kong (CN); Tinhoi Siu, Hong Kong (CN); Wai Hung, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 12/929,262

(22) Filed: Jan. 11, 2011

(65) Prior Publication Data

US 2012/0011286 A1  Jan. 12, 2012

Related U.S. Application Data

(60) Provisional application No. 61/344,380, filed on Jul. 9, 2010.

(51) Int. Cl.
*G06F 3/00* (2006.01)
*H04B 10/00* (2006.01)

(52) U.S. Cl. .......................................... 710/14; 398/138

(58) Field of Classification Search .................... 710/14; 398/138
See application file for complete search history.

(56) References Cited

U.S. PATENT DOCUMENTS

| 2011/0161530 A1* | 6/2011 | Pietri et al. ...................... 710/14 |
| 2011/0181432 A1* | 7/2011 | Ou et al. ......................... 340/664 |
| 2011/0231685 A1* | 9/2011 | Huang et al. .................... 713/321 |
| 2011/0243568 A1* | 10/2011 | Lai ................................. 398/138 |

* cited by examiner

*Primary Examiner* — Hyun Nam
(74) *Attorney, Agent, or Firm* — Nixon & Vanderhye PC

(57) ABSTRACT

The present invention discloses an optical communication module comprising a second mode supporting a data transfer of USB 3.0 standard and a third mode supporting a data transfer of USB 2.0 standard, and the second mode comprises A mode and B mode with a different power consumption and supported data rate, and a detect unit operative to detect idle state of the data traffic on the data path of USB 3.0 standard to determine to stay on the A mode or enter to the B mode automatically during operation in the second mode. The control circuitry can work in different modes to support different status of devices attachment and removal, different data rate of USB 2.0 and 3.0 standards; and it can real time monitor the data traffic to switch different modes to save power consumption. The present invention also discloses a USB cable and a processing method of data transfer for an optical communication module.

27 Claims, 7 Drawing Sheets

OPTICAL COMMUNICATION MODULE, UNIVERSAL SERIAL BUS CABLE WITH THE SAME AND PROCESSING METHOD OF DATA TRANSFER THEREOF

This application claims the benefit of Provisional Application No. 61/344,380, filed 7 Sep. 2010, the entire content of which is hereby incorporated by reference in this application.

FIELD OF THE INVENTION

The present invention relates to the universal serial bus (USB) cable, and more particularly, to an optical communication module and a USB cable with the same, and a processing method of data transfer for the optical communication module.

BACKGROUND OF THE INVENTION

The requirement of fast data transmission and highly dense wirings between the computer and the peripheral device becomes more and more desired nowadays. Meanwhile, general-purpose USB is generally used to connect between a computer and a peripheral device.

A conventional USB cable (with standards USB 2.0 and 3.0) employs an electrical cable to connect and transmit signal (hereinafter, referred to as "electrical USB cable"). Traditionally, the electrical USB cables are formed by twisted pair to reduce the electromagnetic interference (EMI) from environmental noise sources and also the crosstalk between adjacent pairs. However, twist pair would have different wire lengths and hence introduce difference signaling delay to the differential signal; as a result, it will increase jitter and hence reduce the signal quality and transmission bandwidth. Moreover, the transmission length is also limited due to the signal attenuation.

As an alternative to the electrical USB cable, an optical USB cable in which an optical signal is transmitted using optical waveguides has recently been proposed. In the optical USB cable, for example, optical connections rather than electrical connections are used as buses for connecting between a computer and a peripheral device.

Although such optical USB cable can obtain a higher transmission data and a longer transmission distance than that of the electrical USB cable, the energy issue becomes serious. For ensuring the fast data transmission, the conventional optical USB cable is always under a high speed status, no matter it is in the idle status. Thus, the power consumption is quite high, and the energy is wasted, which goes against the actual demand nowadays.

Hence, it is desired to provide an improved optical communication module and a universal serial bus cable to overcome the above-mentioned drawbacks.

SUMMARY OF THE INVENTION

One aspect of the present invention is to provide an optical communication module adapted for different type of attached device's data transfer, which provides a self power management to save energy, and obtain a high data transmission speed and a long distance transmission.

Another aspect of the present invention is to provide a USB cable adapted for different standards of USB for data transfer, which provides a self power management to save energy, and obtain a high data transmission speed and a long distance transmission.

Yet an aspect of the present invention is to provide a processing method of data transfer for an optical communication module, which provides a self power management to save energy, and obtain a high data transmission speed and a long distance transmission.

To achieve the objectives, the present invention provides an optical communication module that comprises an electrical interface, an optical interface adapted for coupling to at least two optical fibers, and an optical module connecting with the optical interface and the electrical interface respectively, the optical module comprising an optical transmitting module, an optical receiving module and a control circuitry connecting with the optical transmitting and receiving modules respectively. The control circuitry comprises:

an initialization mode to disconnect the termination resistors on the data paths of USB 3.0 standard or USB 2.0 standard;

a first mode to detect the type of attached device connecting with the electrical interface, and the attached device is USB 2.0 standard device or USB 3.0 standard device;

a second mode to support a data transfer of USB 3.0 standard, and the second mode comprises A mode and B mode with a different power consumption and supported data rate, and a detect unit to detect idle state of the data traffic on the data path of USB 3.0 standard to determine to stay on the A mode or enter to the B mode automatically during operation in the second mode; and a third mode to support a data transfer of USB 2.0 standard.

Preferably, the optical communication module in the first mode sends and receives a detection result of the type of attached device through the optical fibers, determines to enter the second or the third mode to operate, and enables the corresponding termination resistors on the data paths of USB 3.0 standard or USB 2.0 standard before exit to the corresponding succeeding mode.

Preferably, the optical communication module in the first mode sends a reset signal through the electrical interface to the attached device before exiting to the corresponding succeeding mode when the attached device is a peripheral.

Preferably, the control circuitry detects the removal of the attached device, sends and detects the optical reset signal, and exits to the initialization mode when either the optical reset signal has been sent or received during operation in the second mode.

Preferably, the control circuitry detects the removal of the attached device, sends and detects the optical reset signal, and exits to the initialization mode when either the optical reset signal has been sent or received during operation in the third mode.

Preferably, the optical communication module in A mode supports a transmission data rate ranging from 20 Megabits per second (Mbps) to 5 Gigabits per second (Gbps), and the optical communication module in B mode has lower power consumption than the mode A and supports at least a data rate transmission of 20 Mbps.

More preferably, the optical communication module in A mode has an extended range of transmission data rate from 20 Mbps to 10 Gpbs.

Preferably, the electrical interface is a USB interface, the control circuitry electrically connects to the USB interface, and the optical transmitting module and optical receiving module connect with the optical interface respectively.

Preferably, the optical transmitting module comprises an optical transmitting circuitry and at least one first optoelectronic device connecting with the optical transmitting circuitry and is optically coupling to the optical interface; the optical receiving module comprises an optical receiving circuitry and at least one second optoelectronic device connecting with the optical receiving circuitry and is optically coupling to the optical interface.

Preferably, the first optoelectronic device is a vertical-cavity surface-emitting laser diode, and the second optoelectronic device is a positive-intrinsic-negative photodiode.

Preferably, the optical transmitting circuitry, the optical receiving circuitry and the control circuitry are implemented in the form of a monolithic integrated circuit.

According to the present invention, it provides a USB cable with the optical communication module that comprises a cable assembly with at least two optical fibers and two optical communication modules, each of which connects with each end of the cable assembly respectively. Each optical communication module comprises an electrical interface, an optical interface adapted for coupling to the optical fibers, and an optical module connecting with the optical interface and the electrical interface respectively, the optical communication module comprising an optical transmitting module, an optical receiving module and a control circuitry connecting with the optical transmitting and receiving modules respectively. The control circuitry comprises:

an initialization mode to disconnect the termination resistors on the data path of USB 3.0 standard or USB 2.0 standard;

a first mode to detect the type of attached device connecting with the electrical interface, and the attached device is USB 2.0 standard device or USB 3.0 standard device;

a second mode to support a data transfer of USB 3.0 standard, and the second mode comprises A mode and B mode with a different power consumption and supported data rate, and a detect unit to detect idle state of the data traffic on the data path of USB 3.0 standard to determine to stay on the A mode or enter to the B mode automatically during operation in the second mode; and a third mode to support a data transfer of USB 2.0 standard.

According to the present invention, a processing method of data transfer for an optical communication module, comprises steps of:

(1) powering up an optical communication module comprising an optical transmitting module, an optical receiving module and a control circuitry;

(2) disconnecting the termination resistors on the data paths of USB 2.0 standard and USB 3.0 standard;

(3) entering the first mode and detecting the type of attached device connecting with an electrical interface; if the attached device is USB 3.0 standard device, perform step (4), if the attached device is USB 2.0 standard device, perform step (6);

(4) entering A mode of the second mode supporting a data transfer of USB 3.0 standard;

(5) detecting idle state of the data traffic on the data path of USB 3.0 standard to determine to stay on the A mode or enter to B mode automatically during operation in the second mode; and (6) entering the third mode supporting a data transfer of USB 2.0 standard.

Preferably, in the step (3) it further comprises steps of sending out and receiving a detection result of the type of attached device, determining to enter the second or the third mode to operate, sending a reset signal through the electrical interface to the attached device when it's a peripheral and enabling the corresponding termination resistors on the data paths of USB 3.0 standard or USB 2.0 standard before exit to the corresponding succeeding mode.

Preferably, during operation in the second mode or the third mode, it further comprises steps of detecting the removal of the attached device, sending and detecting the optical reset signal and exiting to the initialization mode when either the optical reset signal has been sent or received.

Preferably, the electrical interface is a USB interface.

Comparing with the prior art, during the second mode of USB 3.0 data transmission, the control circuitry of the present invention can real time monitor the idle status of the data traffic on the USB 3.0 data path. Once an idle status has been detected for a predetermined period, A mode will automatically switch to B mode, which has less power consumption but can still support the low data rate Low Frequency Periodic Signaling (LFPS). On the other hand, when the data traffic is detected to resume, it will switch back to A mode. Similarly, the control circuitry could enter to work in the third mode when both optical modules have been attached to USB 2.0 standard devices. In both the second and the third mode, the control circuitry can detect the removal of the attached devices as to provide a reset condition to the optical modules and an exit path to the initialization mode as to prepare for the next device attachment. Thus, the power consumption is saved and reduced during operation. Moreover, the present invention embeds the optical communication module into the USB cable, which can obtain a high data transmission speed and a long distance transmission.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
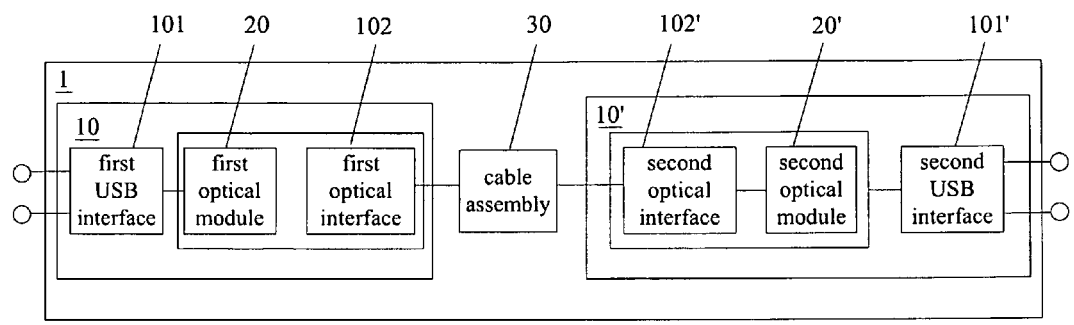
FIG. 1 is a block diagram of a USB cable according to one embodiment of the present invention.

Various preferred embodiments of the invention will now be described with reference to the figures, wherein like reference numerals designate similar parts throughout the various views. The invention is directed to an optical communication module and a USB cable with such an optical communication module, which can provides a self power management to save energy, and obtain a high data transmission speed and a longer transmission distance. The optical communication module is capable of reducing power consumption by utilizing its self power management scheme during the different working modes.

FIG. 1 shows the block diagram of the USB cable 1 according to a first embodiment of the present invention. As illustrated in FIGS. 1-4, the USB cable 1 includes a first USB body 10 with a first optical module 20 embedded therein, a second USB body 10' with a second optical module 20' and a cable assembly 30 connecting there between. Concretely, the USB body 10 and 10' adopt standard USB interfaces that include a first and a second USB interface 101, 101' connecting with the first and the second optical module 20, 20' respectively. A first and a second optical interface 102, 102' connect to the first and second optical module 20, 20' adjacently to the optical fibers 301 respectively, and the first optical interface 102, the first optical module 20 and the first USB interface 101 constitute a first optical communication module. Similarly, the second optical interface 102', the second optical module 20' and the second USB interface 101' constitute a second optical communication module. The first optical interface 102 connects to the second optical interface 102' via the optical fibers 301. Both the first USB interface 101 and the second USB interface 101' can serve as the upstream interface that in general connects to the host, such as a personal computer; and the downstream interface that connects to the outer device, such as a network hub.

With the contemplation of the present invention, the USB cable 1 is compatible with both USB 2.0 standard and USB 3.0 standard, as described thereinafter. That is, the first USB interface 101 and the second USB interface 101' can attach the USB 2.0 standard device or USB 3.0 standard device.

Figure 2A:
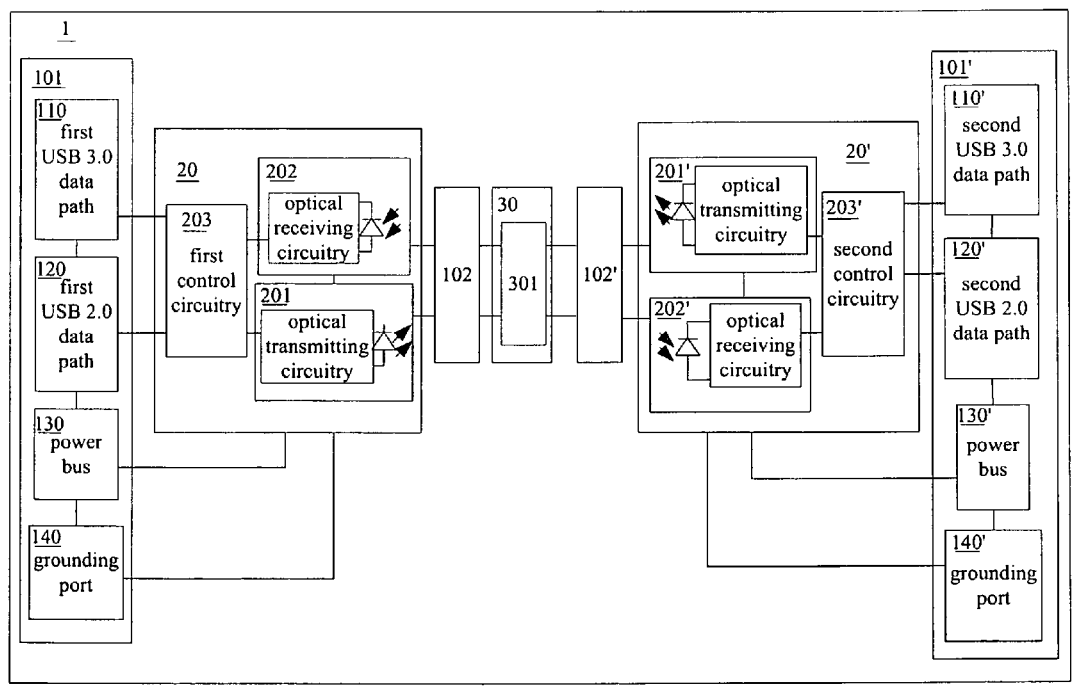
FIG. 2a is a detailed block diagram of the USB cable shown in FIG. 1 illustrating the example of using pure optical fibers for both USB 3.0 and 2.0 data paths.
Figure 2B:
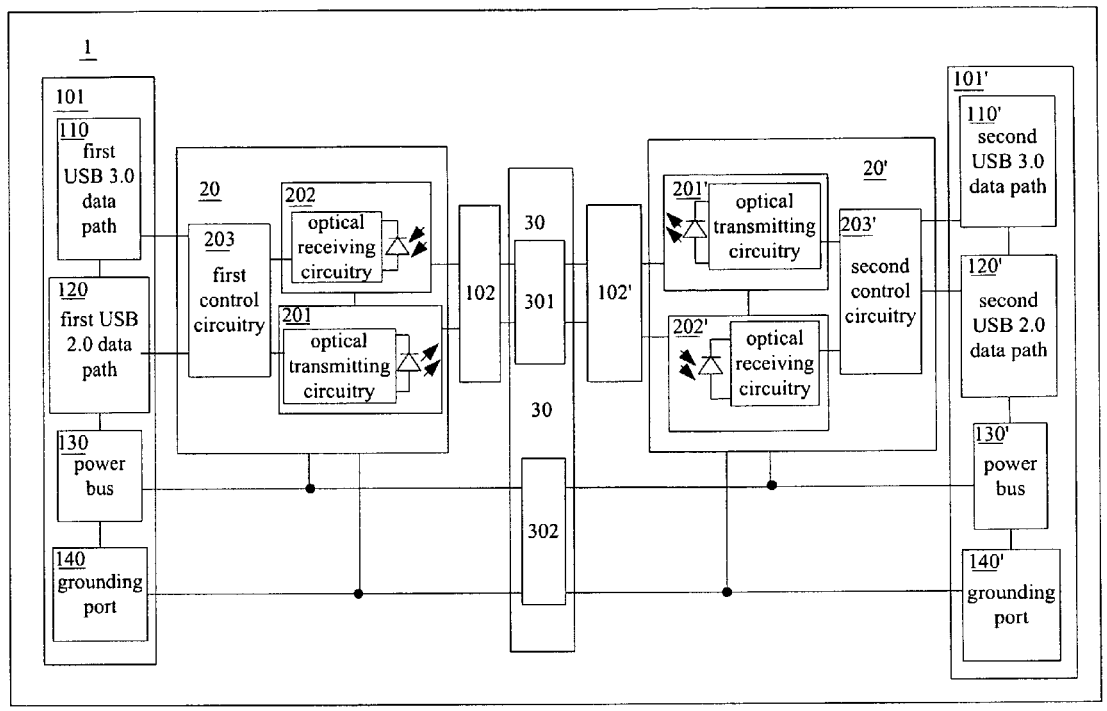
FIG. 2b is a detailed block diagram of the USB cable shown in FIG. 1 illustrating the example of using copper wires to connect the power bus and grounding port.
Figure 3:
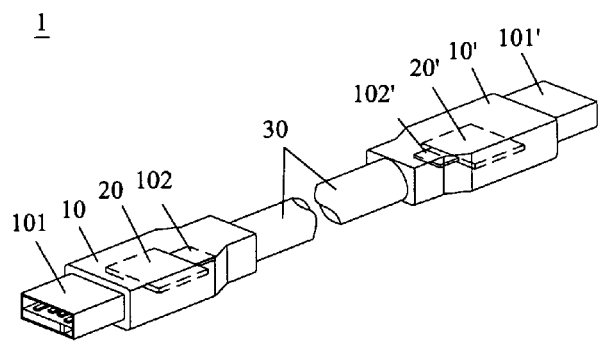
FIG. 3 is a perspective view of the USB cable shown in FIG. 1.
Figure 4:
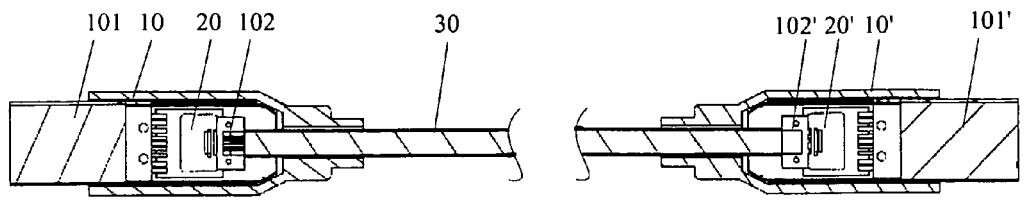
FIG. 4 is a detailed cross-section view of the USB cable shown in FIG. 3.

As shown in FIGS. 2a and FIG. 2b, the first USB interface 101 comprises a first USB 3.0 data path 110 and a first USB 2.0 data path 120, which connect with the first optical module 20. Similarly, the second USB interface 101' also includes a second USB 3.0 data path 110' and a second USB 2.0 data path 120', which connect with the second optical module 20'. The power bus 130 and the grounding port 140 of the first USB interface 101 connect to the first optical module 20. Similarly, the power bus 130' and the grounding port 140' connect to the second optical module 20'.

In case of power transfer required to provide from the downstream port (i.e. host or hub) connected at the first USB interface 101 to the upstream port (i.e. hub or device) connected at the second USB interface 101', the power buses 130, 130' connect together through copper wires 302, and the grounding ports 140, 140' also connect together via the copper wires 302 as illustrating in FIG. 2b.

More specifically, the first and second USB 3.0 data paths 110, 110' adapts to connect to the host, hub or device with USB 3.0 interface, which include transmitting unit and receiving unit respectively, or connect to devices supporting other proprietary standard(s) of high data rate up to 10 Gbps. The first and second USB 2.0 data paths 120, 120' also connect to the D+/D− ports of the host, hub or device, which include transmitting unit and receiving unit supporting USB 2.0 standard.

With the contemplation of the present invention, the first optical module 20 comprises a first optical transmitting module 201, which includes an optical transmitting circuitry connecting to an optoelectronic device, usually a VCSEL (Vertical-Cavity Surface-Emitting Laser), a first optical receiving module 202, which includes an optical receiving circuitry connecting to an optoelectronic device, usually a PIN (positive-intrinsic-negative) photodiode, a first control circuitry 203, which connects with the first USB interface 101 and actuates the first optical transmitting module 201 and the first optical receiving module 202. Similarly, the second optical module 20' comprises a second optical transmitting module 201', a second optical receiving module 202', a second control circuitry 203' that connects with the second USB interface 101' and actuates the second optical transmitting module 201' and the second optical receiving module 202'. The control circuitries 203, 203', the optical transmitting circuitries of the optical transmitting modules 201, 201' and the optical receiving circuitries of the optical receiving modules 202, 202' are implemented in the form of a monolithic integrated circuit (IC).

Concretely, the first control circuitry 203 connects to the first USB 3.0 data path 110 and the first USB 2.0 data path 120, and the second control circuitry 203' connects to the second USB 3.0 data path 110' and the second USB 2.0 data path 120'.

When the USB cable 1 operates, the first USB interface 101 connects with the downstream port of host or hub, for example, the personal computer, firstly, the electrical signal received by the first control circuitry 203 of the first optical module 20 will be converted into optical signal by the first optical transmitting module 201 which is coupled into the first optical interface 102. The optical signal will be transmitted through optical fibers 301 and reach the second optical interface 102' then the second optical module 20'. The second optical receiving module 202' receives the optical signal and converts it into electrical signal, and launches the electrical signal through the second USB interface 101' to the upstream port of hub or device, for example, the network hub or external hard drive. Hereto, the data can be transmitted between the two devices.

Now, an exemplary feature of the optical module according to the present invention will be described. With the contemplation of the invention, the optical modules 20 and 20' of the present invention is operative to execute a self power management according to the different usage and working states, so as to save energy. As the first optical module 20 is similar to the second optical module 20', thus only the first optical module 20 is described here.

Figure 5:
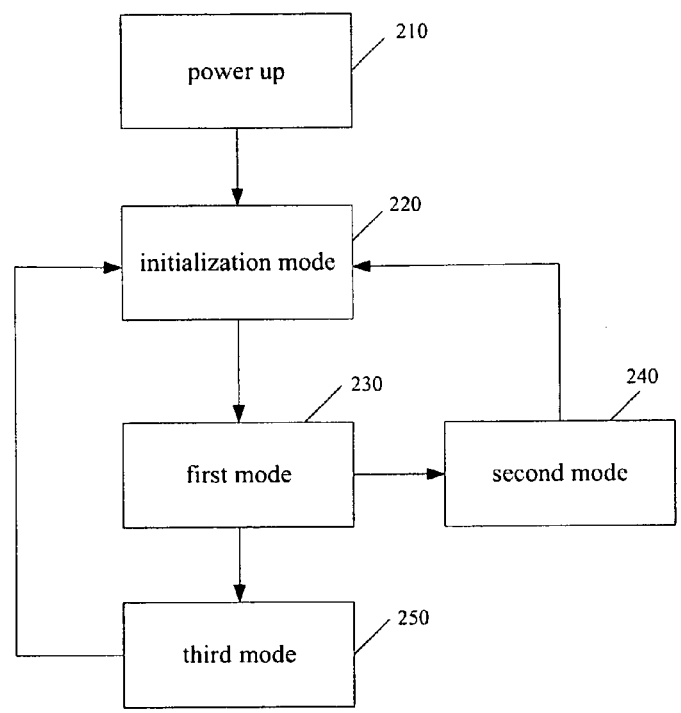
FIG. 5 is a simplified flow chart for the working modes transition of the optical communication module according to one embodiment of the present invention.

As shown in FIG. 5-6, the first optical module 20 includes four modes that are initialization mode 220, first mode 230, second mode 240 and third mode 250. Therein, the initialization mode 220 adapts for disconnecting the termination resistors on the data paths of USB 3.0 and USB 2.0 standard; and the first mode 230 is operative to detect the type of attached device connecting with the first USB interface 101 and send out a detection result.

In this embodiment of the present invention, the second mode 240 is adapted for the USB 3.0 standard device, which has two sub modes, namely the A mode 241 and B mode 242. In particular, the A mode 241 is provided to support, but not be limited to, the lowest and the highest data rate transmission under the USB 3.0 standard, whereas the B mode 242 is the lowest power mode under the second mode 240. Concretely, the B mode 242 will be entered when an idle state of the data traffic is detected at the first USB 3.0 data path 110 for a certain time. It should be noticed that, although the B mode 242 of the second mode 240 has a lower power consumption than the A mode 241, it still can adapt for the LFPS, which is having the lowest data rate of about 20 Mbps under the USB 3.0 standard.

The third mode 250 is adapted for the transmission under the USB 2.0 standard specifically.

The above mentioned modes work selectively by detecting the type of the attached devices at the first USB interface 101 and monitoring the data traffic automatically. Concretely, while the USB 3.0 standard devices are attached to both USB interfaces of the USB cable 1, the A mode 241 of the second mode 240 will be entered, the detect unit in the control circuitry will detect the idle state of the data traffic for a certain time, if it is idle, B mode will be entered automatically for saving energy. The more detail will be described thereinafter.

As shown in FIG. 5, the initialization mode 220 will work when the first control circuitry 203 operates after the first optical module 20 powers up 210. That is, the initialization mode 220 is the immediate state after powering up the first optical module 20. Concretely, the initialization mode 220 allows the first control circuitry 203 to perform the necessary IC initializations. The first control circuitry 203 disconnects all the termination resistors on the SSTX+/SSTX− ports of the USB 3.0 data path 110 and the D+/D− ports of the USB 2.0 data path 120, so as to ensure the attached host, hub or device will not notice the first control circuitry 203's existence before the above devices are detected and a handshaking signal completes between the first optical module 20 and the second optical module 20'. Additionally, in the present invention, the initialization mode 220 can be entered while device removal is detected during the second mode 240 and the third mode 250. After the initialization process completes, the next working state is the first mode 230 as show in FIG. 6a.

Figure 6A:
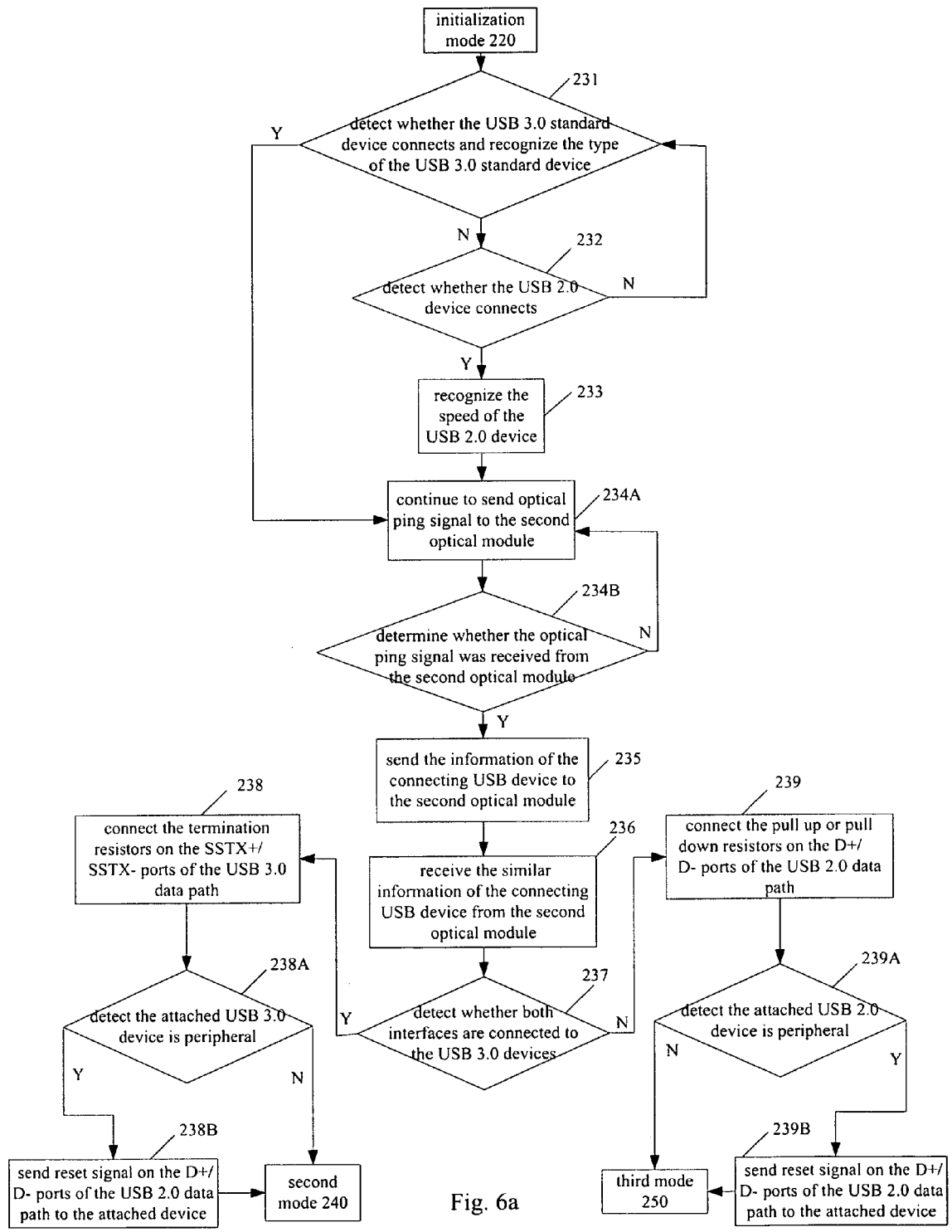
FIG. 6a shows the processing flow of the first mode shown in FIG. 5 for operation in both USB 3.0 and 2.0 standard devices detection.

Turning now to FIG. 6a, it shows a detailed processing flow of the first mode 230 for operates in both USB 3.0 and 2.0 devices detection as a preferred embodiment of the present invention. As mentioned above, the first mode 230 including a detect unit that can detect the types of device that is connected with the first and second USB interfaces 101, 101', and perform different operations. As shown in FIG. 6a, once entering this mode, following steps will be performed.

Step (231), detect whether the USB 3.0 standard device connects and recognize the type of the USB 3.0 standard device.

The USB 3.0 standard device may be a host, hub or peripheral. Concretely, firstly, the optical communication module will detect the existence of Rx termination resistors of the attached devices on the SSRX+/SSRX− of the USB 3.0 data path 110. If the Rx termination resistors are detected, the attached devices will be recognized as host or hub and jump to step (234A); otherwise, it will send an electrical reset signal on the D+/D− ports of the USB 2.0 data path 120 and detect the Rx termination resistors again. If the Rx termination resistors are detected after sending the reset signal, the attached device will be recognized as peripheral and jump to (234A), otherwise, it is determined that no USB 3.0 device is being attached, and then jump to step (232).

Step (232), detect whether the USB 2.0 standard device connects, if yes, perform step (233); otherwise, jump to step (231).

Step (233), recognize the speed of the USB 2.0 standard device, concretely, it identifies data transmission speed of the attached USB 2.0 standard device. It can be high speed, full speed or low speed. Furthermore, the roles (upstream or downstream port) of the USB 2.0 standard device will be recognized in this step. After this operation, jump to step (234A).

Step (234A), continue to send optical ping signal to the second optical module 20'.

Step (234B), determine whether the optical ping signal was received from the second optical module 20', if yes, jump to step (235); otherwise, jump to step (234A).

Step (235), send the information of the connecting USB device to the second optical module 20'.

Step (236), receive the similar information of the connecting USB device from the second optical module 20'.

Step (237), detect whether the first and second USB interfaces 101, 101' are connected to the USB 3.0 standard devices, if yes, perform step (238), otherwise, perform step (239).

Step (238), connect the termination resistors on the SSTX+/SSTX− ports of the USB 3.0 data path 110; after this operation, jump to step (238A).

Step (238A), detect the attached USB 3.0 standard device is peripheral, if yes, jump to step (238B); otherwise, enter to the second mode 240.

Step (238B), send reset signal on the D+/D− ports of the USB 2.0 data path 120 to the attached device; hereto, the process will enter to the second mode 240.

Step (239), connect the pull-up or pull-down resistors on the D+/D− ports of the USB 2.0 data path 120 depending on the type of devices (high speed/full speed/low speed) detected on the first and second USB interfaces 101, 101' and their respective roles (upstream or downstream port).

Step (239A), detect the attached USB 2.0 standard device is peripheral, if yes, jump to step (239B); otherwise, enter to the third mode 250.

Step (239B), send reset signal on the D+/D− ports of the USB 2.0 data path 120 to the attached device; hereto, the process will enter to the second mode 250.

Figure 6B:
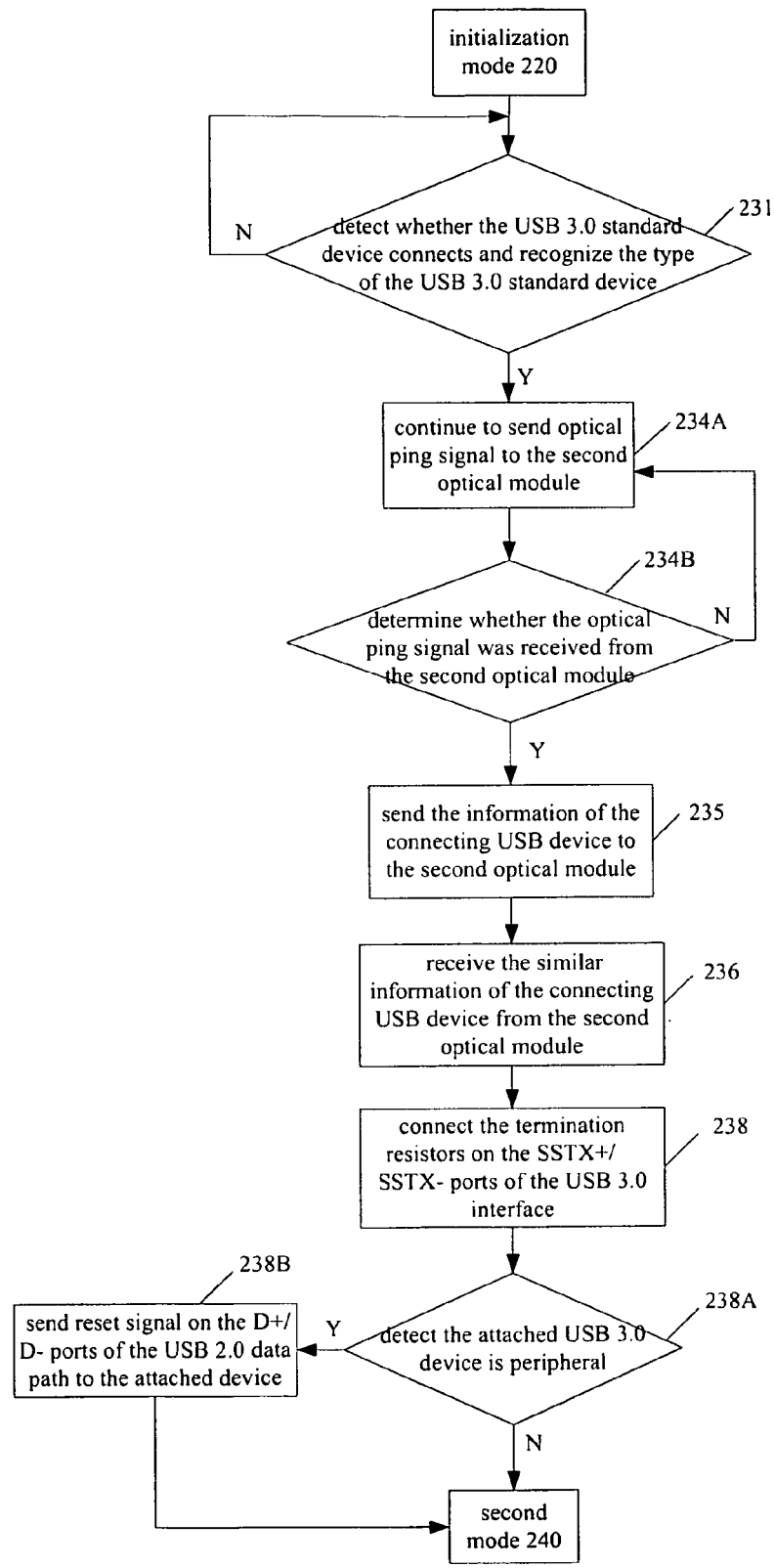
FIG. 6b shows the processing flow of the first mode shown in FIG. 5 for operation in USB 3.0 standard devices detection only.

Furthermore, for the applications where USB 3.0 operation is required only, another embodiment can be modified from the embodiment presented in FIG. 6a, which is shown in FIG. 6b, As shown in FIG. 6b, it illustrates the modified processing flow of the first mode shown in FIG. 6a for operation in USB 3.0 devices detection only. More concretely, the relating processing blocks for USB 2.0 standard devices in steps 232, 233, 237, 239, 239A and 239B have been removed. The following steps will be performed.

Step (231), detect whether the USB 3.0 standard device connects and recognize the type of the USB 3.0 standard device.

The USB 3.0 standard device may be a host, hub or peripheral. Concretely, firstly, the optical communication module will detect the existence of Rx termination resistors of the attached devices on the SSRX+/SSRX− of the USB 3.0 data path 110. If the Rx termination resistors are detected, the attached devices will be recognized as host or hub and jump to step (234A); otherwise, it will send an electrical reset signal on the D+/D− ports of the USB 2.0 data path 120 and detect the Rx termination resistors again. If the Rx termination resistors are detected after sending the reset signal, the attached device will be recognized as peripheral and jump to (234A), otherwise, circulate the instant step (231).

Step (234A), continue to send optical ping signal to the second optical module 20'.

Step (234B), determine whether the optical ping signal was received from the second optical module 20', if yes, jump to step (235); otherwise, jump to step (234A).

Step (235), send the information of the connecting USB device to the second optical module 20'.

Step (236), receive the similar information of the connecting USB device from the second optical module 20'.

Step (238), connect the termination resistors on the SSTX+/SSTX− ports of the USB 3.0 interface 110; after this operation, jump to step (238A).

Step (238A), detect the attached USB 3.0 device is peripheral, if yes, jumper to step (238B); otherwise, enter to the second mode 240.

Step (238B), send reset signal on the D+/D− ports of the USB 2.0 data path 120 to the attached device; hereto, the process will enter to the second mode 240.

Figure 7:
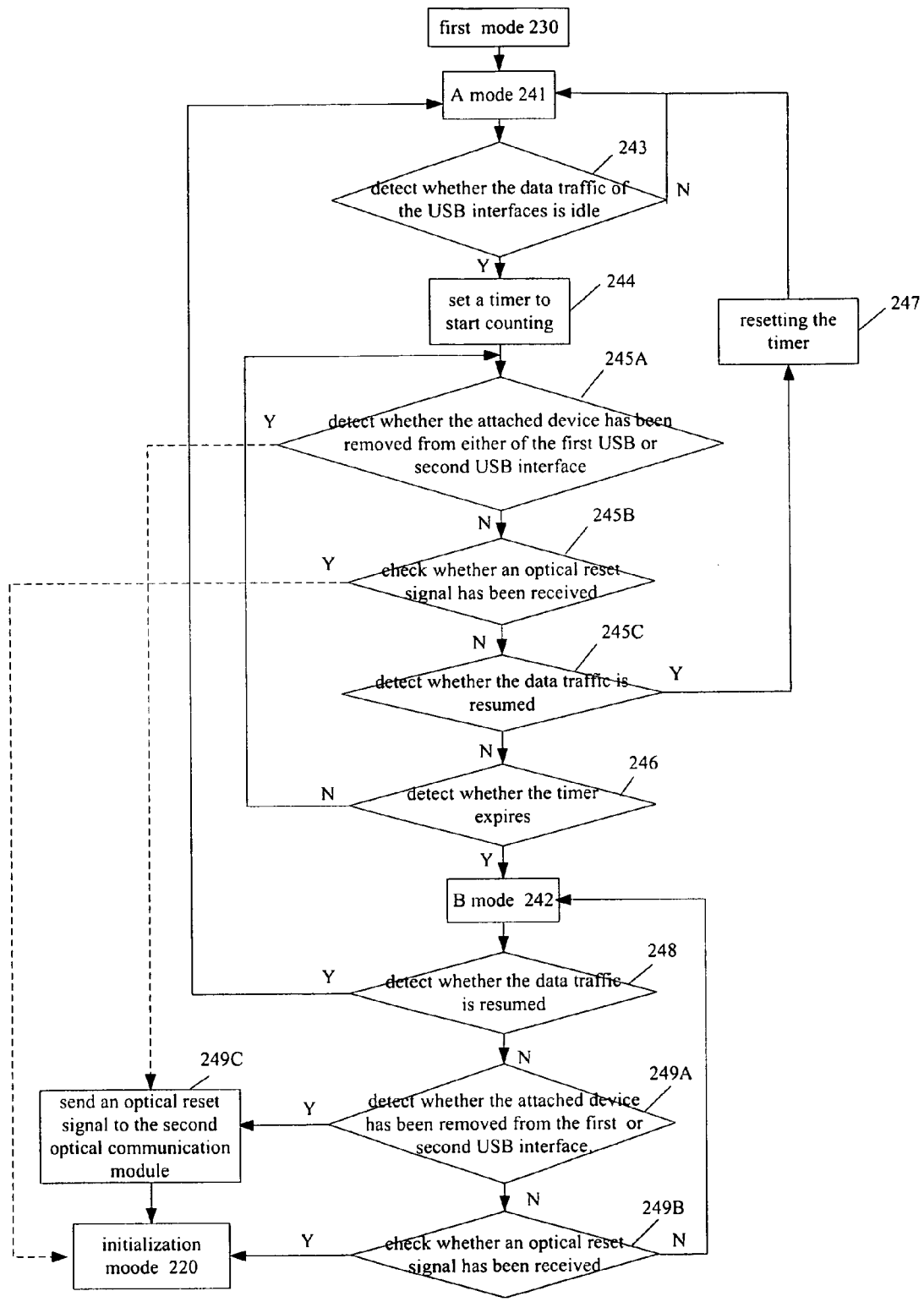
FIG. 7 shows the processing flow of the second mode shown in FIG. 5.

FIG. 7 shows the processing flow of the second mode 240, which can support a wide range of data rates transmission that is from 20 Mbps to 5 Gbps of the USB 3.0 standard. Moreover, the data rate can reach over 10 Gbps. As mentioned above, the second mode 240 includes the A mode 241 and B mode 242, Concretely, the A mode 241 is provided to support from the LFPS to the highest data rate transmission under the USB 3.0 standard, that is from 20 Mbps to 10 Gbps, whereas the B mode 242 which is having a lower power consumption than the A mode 241 can support the LFPS data rate transmission under the USB 3.0 standard.

When the second mode 240 is entered from the first mode 230, the USB cable 1 will enter to the A mode 241, and following steps will be performed as shown in FIG. 7.

Step (243), detect whether the data traffic of the USB interfaces is idle. Concretely, detect whether the traffic of the SSTX+/SSTX− and SSRX+/SSRX− ports of the USB interfaces is idle. If yes, perform step (244); otherwise, continue the step (243).

Step (244), set a timer to start counting.

Step (245A), detect whether the attached device has been removed from either of the first or second USB interfaces 101, 101'. If yes, jump to step (249C), otherwise, perform step (245B).

Step (245B), check whether an optical reset signal has been received. If yes, jump to the initialization mode 220 for the next cycle of link setup, otherwise, perform step (245C).

Step (245C), detect whether the data traffic is resumed, if yes, perform step (247), otherwise, perform step (246).

Step (246), detect whether the timer expires, if yes, jump to the B mode 242, otherwise, jump to step (245A).

Step (247), reset the timer and maintain the A mode 241.

Concretely, inside the B mode 242, the following processing steps will be performed continually.

Step (248), detect whether the data traffic is resumed, if yes, jump to the A mode 241, otherwise, perform the step (249A).

Step (249A), detect whether the attached device has been removed from the first USB interface or the second USB interface. If yes, jump to step (249C), otherwise, perform step (249B).

Step (249B), check whether an optical reset signal has been received. If yes, jump to the initialization mode 220 for the next cycle of link setup, otherwise, maintain the B mode 242.

Step (249C), send an optical reset signal to the second optical communication module and jump to the initialization mode 220.

Figure 8:
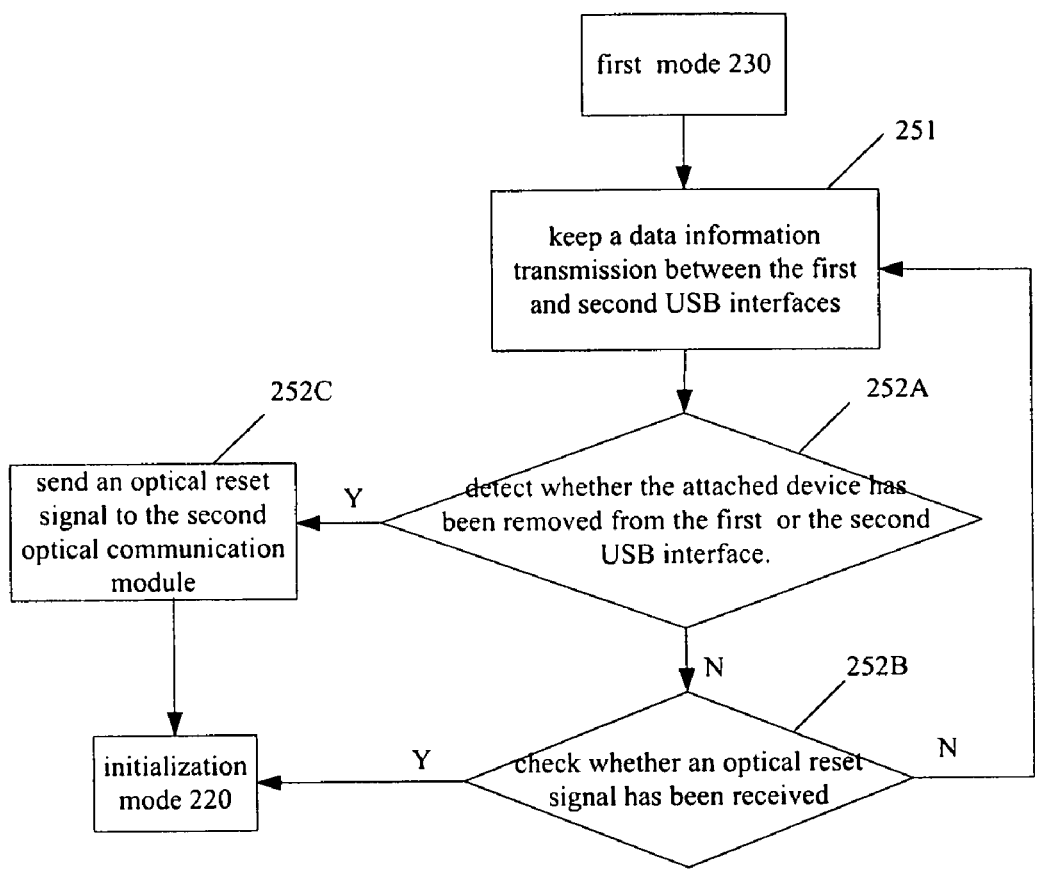
FIG. 8 shows the process flow of the third mode shown in FIG. 5.

FIG. 8 shows detailed process of the third mode 250 that support the USB 2.0 standard. Concretely, the USB 2.0 standard includes high speed, full speed and low speed. As shown in FIG. 8, the following steps are performed.

Step (251), keep a data information transmission between the first and second USB interfaces 101, 101'.

Step (252A), detect whether the attached device has been removed from the first and second USB interfaces 101, 101'. If yes, jump to step (252C), otherwise, perform the step (252B).

Step (252B), check whether an optical reset signal has been received. If yes, jump to the initialization mode 220 for the next cycle of link setup, otherwise, return to step (251).

Step (252C), send an optical reset signal to the second optical communication module and jump to the initialization mode 220.

In conclusion, the USB cable 1 has four working modes generally, and the working modes can transit from one to other automatically so as to save energy. Especially, the initialization mode 220 disconnects the termination resistors on the USB 2.0 and USB 3.0 data paths, the first mode 230 is capable of detecting the type of attached device connecting with the first USB interface 101 of the first optical communication module and the second USB interface 101' of the second optical communication module and sending out a detection result, it will judge the USB 2.0 standard device or USB 3.0 standard device, and enter the corresponding data transfer mode. The second mode 240 can reach a data rate of over 10 Gbps when transferring a tremendous data under the USB 3.0 standard and other proprietary standards. Moreover, the second mode 240 is subdivided into A mode 241 and B mode 242 to further control power consumption of the USB cable 1 by limiting the allowed data rate in the B mode 242. The A mode 241 can be automatically switched to B mode 242 by detecting the idle state of the data traffic, thus, the energy can be saved while the data traffic is idle for the B mode having a lower power consumption. The third mode 250 supports data transmission under the USB 2.0 standard.

Furthermore, due to the use of optical fibers as transmission medium, the transmission distance of the USB cable 1 can be configured much longer than the prior art, which meets the demand of practical long distance applications. And the use of optical fiber in the USB cable 1 of the present invention can significantly reduce the electromagnetic interference (EMI) issue and improve the signal integrity, which are usually the problems in conventional copper wire cables.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An optical communication module, wherein the optical communication module comprises an electrical interface, an optical interface configured to couple to at least two optical fibers, and an optical module connecting with the optical interface and the electrical interface respectively, the optical module comprising an optical transmitting module, an optical receiving module and control circuitry connecting with the optical transmitting and receiving modules respectively;

wherein the control circuitry comprises:
an initialization mode to disconnect termination resistors on USB 3.0 standard or USB 2.0 standard data paths;
a first mode to detect the type of attached device connecting with the electrical interface, and the attached device is USB 2.0 standard device or USB 3.0 standard device;
a second mode to support a data transfer of USB 3.0 standard, and the second mode comprises A mode and B mode with a different power consumption and supported data rate, and a detect unit to detect idle state of data traffic on the data path of USB 3.0 standard to determine to stay on the A mode or enter to the B mode automatically during operation in the second mode;
the optical communication module in A mode supporting a transmission data rate ranging from 20 Mbps to 5 Gbps, and the optical communication module in B mode having lower power consumption than the mode A and supporting at least a data rate transmission of 20Mbps; and
a third mode to support a data transfer of USB 2.0 standard.

2. The optical communication module of claim 1, wherein the control circuitry in the first mode sends and receives a detection result of the type of attached device through the optical fibers, determines to enter the second or the third mode to operate, and enables the corresponding termination resistors on the data paths of USB 3.0 standard or USB 2.0 standard before exit to the corresponding succeeding mode.

3. The optical communication module of claim 2, wherein the control circuitry in the first mode sends a reset signal through the electrical interface to the attached device before exiting to the corresponding succeeding mode when the attached device is a peripheral.

4. The optical communication module of claim 3, wherein the control circuitry detects the removal of the attached device, sends and detects an optical reset signal, and exits to the initialization mode when either the optical reset signal has been sent or received during operation in the second mode.

5. The optical communication module of claim 3, wherein the control circuitry detects the removal of the attached device, sends and detects an optical reset signal, and exits to the initialization mode when either the optical reset signal has been sent or received during operation in the third mode.

6. The optical communication module of claim 1, wherein the optical communication module in A mode has an extended range of transmission data rate from 20 Mbps to 10 Gpbs.

7. The optical communication module of claim 1, wherein the electrical interface is a USB interface, the control circuitry electrically connects to the USB interface, and the optical transmitting module and the optical receiving module connect with the optical interface respectively.

8. The optical communication module of claim 1, wherein the optical transmitting module comprises an optical transmitting circuitry and at least one first optoelectronic device connecting with the optical transmitting circuitry and is optically coupling to the optical interface; the optical receiving module comprises an optical receiving circuitry and at least one second optoelectronic device connecting with the optical receiving circuitry and is optically coupling to the optical interface.

9. The optical communication module of claim 8, wherein the first optoelectronic device is a vertical-cavity surface-emitting laser diode, and the second optoelectronic device is a positive-intrinsic-negative photodiode.

10. The optical communication module of claim 1, wherein the optical transmitting circuitry, the optical receiving circuitry and the control circuitry are implemented in the form of a monolithic integrated circuit.

11. A USB cable, comprising:
a cable assembly with at least two optical fibers; and
two optical communication modules, each of which connects with each end of the cable assembly respectively;
wherein each optical communication module comprises an electrical interface, an optical interface configured to couple to the optical fibers, and an optical module connecting with the optical interface and the electrical interface respectively, the optical communication module comprising an optical transmitting module, an optical receiving module and control circuitry connecting with the optical transmitting and receiving modules respectively;
wherein the control circuitry comprises:
an initialization mode to disconnect termination resistors on USB 3.0 standard or USB 2.0 standard data paths;
a first mode to detect the type of attached device connecting with the electrical interface, and the attached device is USB 2.0 standard device or USB 3.0 standard device;
a second mode to support a data transfer of USB 3.0 standard, and the second mode comprises A mode and B mode with a different power consumption and supported data rate, and a detect unit to detect idle state of data traffic on the data path of USB 3.0 standard to determine to stay on the A mode or enter to the B mode automatically during operation in the second mode;
the optical communication module in A mode supporting a transmission data rate ranging from 20 Mbps to 5Gbps, and the optical communication module in B mode having lower power consumption than the mode A and supporting at least a data rate transmission of 20 Mbps; and
a third mode to support a data transfer of USB 2.0 standard.

12. The USB cable of claim 11, wherein the control circuitry in the USB cable in the first mode sends and receives a detection result of the type of attached device through the optical fibers, and determine to enter the second or the third mode to operate, and enable the corresponding termination resistors on the data path of USB 3.0 standard or USB 2.0 standard before exit to the corresponding succeeding mode.

13. The USB cable of claim 12, wherein the control circuitry in the USB cable in the first mode sends a reset signal through the electrical interface to the attached device before exiting to the corresponding succeeding mode when the attached device is a peripheral.

14. The USB cable of claim 13, wherein the control circuitry checks the removal of the attached device, sends and detects the optical reset signal, and exits to the initialization mode when either the optical reset signal has been sent or received during operation in the second mode.

15. The USB cable of claim 13, wherein the control circuitry detects the removal of the attached device, sends and detects the optical reset signal, and exits to the initialization mode when either the optical reset signal has been sent or received during operation in the third mode.

16. The USB cable of claim 11, wherein the optical communication module in A mode has an expanded range of transmission data rate from 20 Mbps to 10 Gpbs.

17. The USB cable of claim 11, wherein the electrical interface is a USB interface, the control circuitry electrically connects to the USB interface, and the optical transmitting module and the optical receiving module connect with the optical interface respectively.

18. The USB cable of claim 11, wherein the optical transmitting module comprises an optical transmitting circuitry and at least one first optoelectronic device connecting with the optical transmitting circuitry and is optically coupling to the optical interface; the optical receiving module comprises an optical receiving circuitry and at least one second optoelectronic device connecting with the optical receiving circuitry and is optically coupling to the optical interface.

19. The USB cable of claim 18, wherein the first optoelectronic device is a vertical-cavity surface-emitting laser diode, and the second optoelectronic device is a positive-intrinsic-negative photodiode.

20. The USB cable of claim 11, wherein the optical interface of each optical communication module connects with the cable assembly.

21. The USB cable of claim 11, wherein the cable assembly further comprises at least two copper wires for connecting power bus and grounding port between the two electrical interfaces and the two optical communication modules.

22. The USB cable of claim 11, wherein the optical transmitting circuitry, the optical receiving circuitry and the control circuitry are implemented in the form of a monolithic integrated circuit.

23. A processing method of data transfer for an optical communication module, the method comprising:
(1) powering up an optical communication module comprising an optical transmitting module, an optical receiving module and control circuitry;

(2) entering an initialization mode, disconnecting termination resistors on USB 2.0 standard and USB 3.0 standard data paths;

(3) entering a first mode and detecting the type of attached device connecting with an electrical interface; if the attached device is USB 3.0 standard device, perform (4), if the attached device is USB 2.0 standard device, perform (6);

(4) entering A mode of a second mode supporting a data transfer of USB 3.0 standard;

(5) detecting idle state of data traffic on the data path of USB 3.0 standard to determine to stay on the A mode or enter to B mode automatically during operation in the second mode; the optical communication module in A mode supporting a transmission data rate ranging from 20 Mbps to 5 Gbps, and the optical communication module in B mode having lower power consumption than the mode A and supporting at least a data rate transmission of 20 Mbps; and (6) entering a third mode supporting a data transfer of USB 2.0 standard.

24. The processing method of claim 23, wherein (3) further comprises:

sending out and receiving a detection result of the type of attached device;

determining to enter the second or the third mode to operate;

sending a reset signal through the electrical interface to the attached device when it is a peripheral; and enabling the corresponding termination resistors on the data paths of USB 3.0 standard or USB 2.0 standard before exit to the corresponding succeeding mode.

25. The processing method of claim 23, wherein further comprising, during operation in the second mode or the third mode:

detecting the removal of the attached device;

sending and detecting an optical reset signal; and exiting to the initialization mode when either the optical reset signal has been sent or received.

26. The processing method of claim 23, wherein the optical communication module in A mode supports an expanded the range of transmission data rate from 20 Mbps to 10 Gpbs.

27. The processing method of claim 23, wherein the electrical interface is a USB interface.

* * * * *